US012750562B2

(12) United States Patent
Narayanaswamy et al.

(10) Patent No.: US 12,750,562 B2
(45) Date of Patent: Sep. 29, 2026

(54) METHOD AND SYSTEM FOR ADVERTISEMENT ON DEMAND

(71) Applicant: ARRIS Enterprises LLC, Suwanee, GA (US)

(72) Inventors: Ramesh Narayanaswamy, Bangalore (IN); Anand Madhav Rao Hallur, Bangalore (IN)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 17/735,265

(22) Filed: May 3, 2022

(65) Prior Publication Data

US 2023/0020848 A1 Jan. 19, 2023

Related U.S. Application Data

(60) Provisional application No. 63/222,607, filed on Jul. 16, 2021.

(51) Int. Cl.
*H04N 21/81* (2011.01)
*H04N 21/234* (2011.01)
*H04N 21/478* (2011.01)

(52) U.S. Cl.
CPC ..... *H04N 21/812* (2013.01); *H04N 21/23424* (2013.01); *H04N 21/47815* (2013.01)

(58) Field of Classification Search
CPC ........... H04N 21/812; H04N 21/23424; H04N 21/47815
See application file for complete search history.

(56) References Cited

U.S. PATENT DOCUMENTS 10,135,899 B1 * 11/2018 Nielsen ................. H04L 65/611
10,327,026 B1 * 6/2019 Mishra ............... H04N 21/2668
10,839,416 B1 * 11/2020 Desmond ........... H04N 21/2668
11,218,784 B1 * 1/2022 Mekuria ................ H04N 21/84
11,245,935 B1 * 2/2022 Shams ................. H04N 21/812
11,516,523 B2 * 11/2022 Smith .................. H04N 21/462
2010/0293050 A1 * 11/2010 Maher ................. G06F 16/9535 705/14.46
2013/0091521 A1 * 4/2013 Phillips ............ H04N 21/23424 725/35

(Continued)

OTHER PUBLICATIONS

Hassan, Noor et al, "How to use Amazon Rekognition Video for product placement in video", AWS Media Blog, Jul. 14, 2020, 27 pps.

*Primary Examiner* — Nathan J Flynn
*Assistant Examiner* — Christine A Kurien
(74) *Attorney, Agent, or Firm* — Chernoff, Vilhauer, McClung & Stenzel, LLP

(57) ABSTRACT

A method, a non-transitory computer readable medium, and a system are disclosed for advertisement on demand. The method includes uploading, on a cloud server, media content with embedded advertisement on demand content; forwarding, from the cloud server, the media content with the embedded advertisement on demand content to a media consumption device; receiving, on the cloud server, a request for the embedded advertisement on demand content from the media consumption device; and forwarding, from the cloud server, information on the requested embedded advertisement to the media consumption device.

22 Claims, 4 Drawing Sheets

(56) References Cited

U.S. PATENT DOCUMENTS

| | | | | |
|---|---|---|---|---|
| 2013/0290556 | A1* | 10/2013 | Giladi | H04N 21/812 709/231 |
| 2016/0182923 | A1* | 6/2016 | Higgs | H04H 20/106 725/34 |
| 2016/0241914 | A1* | 8/2016 | Shenkler | G11B 25/04 |
| 2016/0261921 | A1* | 9/2016 | Malko | H04N 21/47815 |
| 2017/0041655 | A1* | 2/2017 | Harrison | H04N 21/812 |
| 2019/0132630 | A1* | 5/2019 | Loheide | H04N 21/23439 |
| 2020/0145728 | A1* | 5/2020 | Kamela | H04N 21/8586 |
| 2020/0213645 | A1* | 7/2020 | Sodagar | H04N 21/23424 |
| 2020/0275148 | A1* | 8/2020 | Stockhammer | H04N 21/2668 |
| 2021/0306686 | A1* | 9/2021 | Link | H04N 21/26258 |
| 2021/0401362 | A1* | 12/2021 | Klappert | A61B 5/486 |
| 2022/0337910 | A1* | 10/2022 | Delgado | H04N 21/8186 |
| 2023/0020848 | A1* | 1/2023 | Narayanaswamy | H04N 21/2668 |

* cited by examiner

METHOD AND SYSTEM FOR ADVERTISEMENT ON DEMAND

TECHNICAL FIELD

The present disclosure generally relates to a method and system for advertisement on demand.

BACKGROUND

Advertisements are generally considered necessary in the delivery of media content, but users try to watch them as little as possible. Many times, the content provider offers special packages so that the number of advertisements can be minimized and/or eliminated. It would be desirable if the user could choose the types of advertisement, which are selected by the user during viewing of the media content.

SUMMARY

In accordance with exemplary embodiments, a method and system is disclosed that provides for advertisement on demand in which users can choose the type of products or services that are of interest to the user during the viewing of the media content.

In accordance with an aspect, a method is disclosed for advertisement on demand, the method comprising: uploading, on a cloud server, media content with embedded advertisement on demand content; forwarding, from the cloud server, the media content with the embedded advertisement on demand content to a media consumption device; receiving, on the cloud server, a request for the embedded advertisement on demand content from the media consumption device; and forwarding, from the cloud server, information on the requested embedded advertisement to the media consumption device.

In accordance with another aspect, a non-transitory computer readable medium storing computer readable program code executed by a processor for advertisement on demand is disclosed, the process comprising: uploading, on a cloud server, media content with embedded advertisement on demand content; forwarding, from the cloud server, the media content with the embedded advertisement on demand content to a media consumption device; receiving, on the cloud server, a request for the embedded advertisement on demand content from the media consumption device; and forwarding, from the cloud server, information on the requested embedded advertisement to the media consumption device.

In accordance with an aspect, a system is disclosed for advertisement on demand, the system comprising: a memory; and a processor configured to: store media content with embedded advertisement on demand content; forward the media content with the embedded advertisement on demand content to a media consumption device; receive a request for the embedded advertisement on demand content from the media consumption device; and forward information on the requested embedded advertisement to the media consumption device.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

System for Advertisement on Demand

Figure 1:
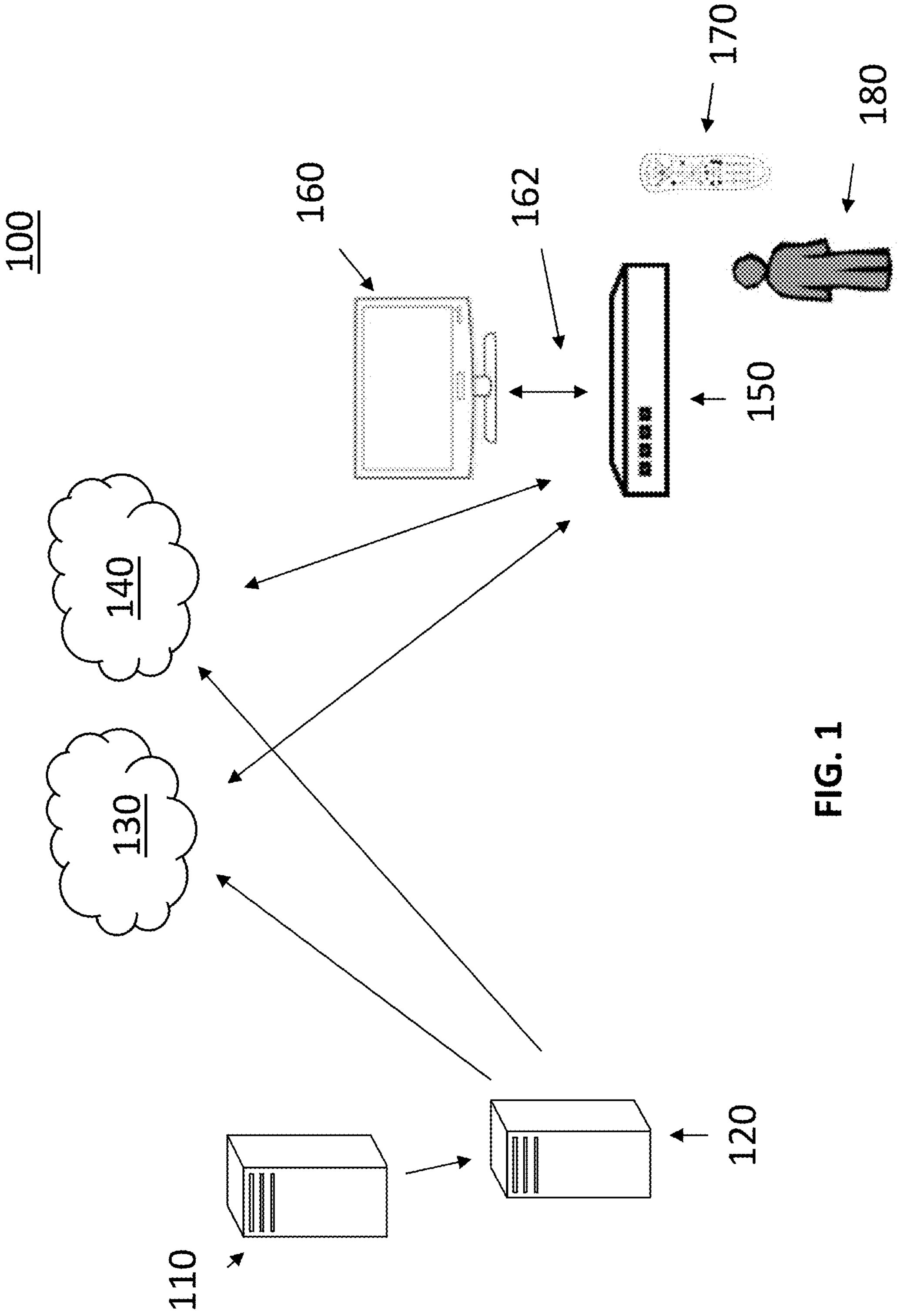
FIG. 1 is a block diagram illustrating an exemplary network environment for advertisement on demand in accordance with an exemplary embodiment.

FIG. 1 is a block diagram illustrating an example network environment 100 for advertisement on demand in accordance with an exemplary embodiment. As shown in FIG. 1, the environment 100 includes a content source or content provider 110 configured to provide media content, an upload content server 120 for uploading the content to a content server 130. The upload content server 120 is also configured to create context information, which is embedded into the media content as disclosed herein. The exemplary network 100 also includes an advertisement on demand service server 140, one or more media consumption devices 150, and a remote media player 160. In accordance with an exemplary embodiment, the content provider 110 can be a content delivery network (CDN) that can provide, for example, the media content to the content server 130 via, for example, the upload content server 120. In accordance with an exemplary embodiment, the content server 130 and the advertisement on demand service server 140 are cloud servers, and in an exemplary embodiment, the content server 130 and the advertisement on demand service server 140 can be combined into a single cloud server, one or more cloud servers, or alternatively, a plurality of cloud servers.

In accordance with an exemplary embodiment, the media consumption device 150 can be, for example, a set-top box (STB). The media consumption device (or set-top box) 150 may communicate with the remote media play devices 160 over a local network 162 (for example, a local area network (LAN), a wireless local area network (WLAN), a personal area network (PAN), etc.) and/or wired, for example, a television.

In accordance with an exemplary embodiment, the remote media play device 160 may be any type of computing device configured to connect via a wireless network, for example, wireless network utilizing an IEEE 802.11 specification, including a smart phone, a smart TV, a computer, a mobile device, a tablet, or any other device operable to communicate wirelessly with the media consumption device 150. In accordance with an alternative embodiment, the remote media play device 160 can be a television, for example, that is directly connected to the media consumption device 150. Alternatively, the media consumption device 150 can be a smart phone, a smart TV, a computer, a mobile device, a tablet, or any other device operable to communicate with the content cloud server 130 and the advertisement on demand service server 140, and wherein the media consumption device 150 also provides the user the ability to view the media content on the media consumption device 150.

As shown in FIG. 1, a user 180 while watching the media content received from the content provider 110 may receive content that includes, for example, a special package from a media content provider that uploads the media to the content cloud server 130. In accordance with an embodiment, the media content can be uploaded to the content cloud server 130 via the upload content server 120, and wherein the media content is free of any advertisements (e.g., advertisements that are inserted into the media content or pushed to the user during the viewing of the media content). In accordance with an exemplary embodiment, the media content that is free of advertisements has embedded advertisement information that the user 180 can select during the viewing of the media content as disclosed herein. For example, the user 180 while watching the media content that has been received may be interested in the outfits and accessories worn by an actor, or the location of the scene. Since the user is interested in the outfits and accessories (e.g., products) that are being worn by the actor and/or the location of the scene (e.g., services), the user 180 can obtain additional information on the outfits and accessories and/or the location of the scene by pressing an information key or other key or keys, for example, on a remote controller 170 in communication with the media consumption device 150. In accordance with an exemplary embodiment, the user 180 can receive an option that once the information key has been pressed to details on the outfits and accessories and/or the scene being displayed. For example, a list of each of the products or services currently being displayed or shown on the remote media play device 180 can be shown to the user 180. The user 180 can then select, for example, the accessories, for example, sunglasses, as the choice for receiving advertisements. In accordance with another embodiment, rather than using a remote controller, a mobile device can pointed at the remote play media device 160 and through augmented reality (AR) technology, a list of available products or services being shown in the media content could be displayed on the mobile device.

In accordance with an exemplary embodiment, the media consumption device 150 can sent a request to the advertisement on demand service server 140 (e.g., cloud server), which provides the media consumption device 150 with information on the sunglass, which can be displayed on the remote media player 160, or alternatively, on a display screen of the media consumption device 150.

In accordance with an exemplary embodiment, after the user 180 has viewed the advertisements and obtained a better idea of the item, the user 180 can continue to watch the media content, which has been paused during the receipt of the advertisement on demand. In addition, the user 180 may also have the option to purchase the item, for example, the sunglasses, via input from remote controller 170 or input into a user interface (UI) of the media consumption device 150, or the remote media player 160.

In accordance with an exemplary embodiment, since the advertisements are requested by the user 180 rather than pushed to the user 180, advertisers can expected to have a much better chance of resulting in a sale than having advertisements pushed to the user during the viewing of the media content. In accordance with exemplary embodiment, the implementation of the on-demand advertisements as disclosed herein can also provide options for instant purchase of items featured in the advertisement that are not typically available with advertisements that are inserted into the media content or pushed to the user. In addition, the method and system as disclosed herein can also provide a mechanism for maintaining contextual information for suggesting relevant items to the user while the media content is being played.

In accordance with exemplary embodiment, the system and method as disclosed herein can be configured such that the content provider can create the contextual information and modify the same as appropriate at various times. In addition, the system and method as disclosed herein can be for premium content that the user 180 pays for as an additional feature. However, the content is equally applicable for content that the user 180 does not pay for the specific media content, or that is included, for example, in a subscription based service plan. In accordance with an exemplary embodiment, the user could be required to select one or more products or services in the form of advertisement on demand during a set period of time or a number of frames viewed in order to continue with the viewing of the media content.

Figure 2:
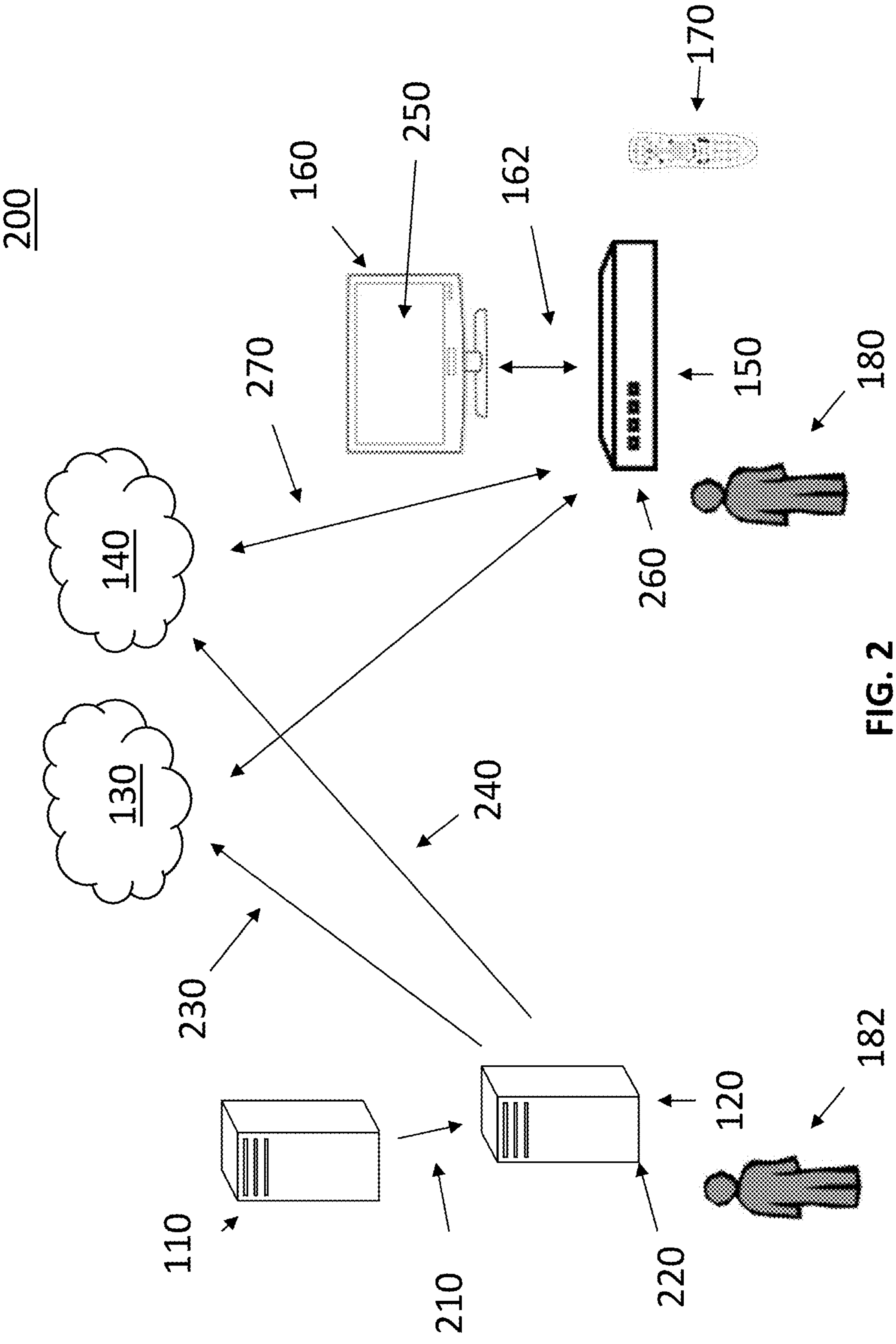
FIG. 2 is a block diagram illustrating a method for advertisement on demand in accordance with an exemplary embodiment.

FIG. 2 is a block diagram 200 illustrating a method for advertisement on demand in accordance with an exemplary embodiment. As shown in FIG. 2, in step 210, the media content is received, for example, by a provider (or service provider) for the embedding of the advertisements on demand. For example, in step 220, the media content can be reviewed by a representative 182 of the service provider for appropriate places for adding contextual information in the form of embedded advertisement on demand content. In accordance with an exemplary embodiment, the review of the media content for input of advertisement on demand content can be done manually. Alternatively, the advertisement on demand content be embedded via an automated process.

In accordance with an exemplary embodiment, the representative 182 of the service provider can create a context file, which can include embedded context information or advertisement on demand content that is embedded into the media content. In accordance with an exemplary embodiment, the media content file may be modified to include contextual information or advertisement on demand content through the use of SCTE-35, for example, if the media content is delivered to the user 180 as mpeg-ts stream or transport stream content. Alternatively, the media content with embedded advertisement on demand content can include other known method such as methods for embedding subtitle text into media content, or through, for example, the use of custom tags.

In accordance with an exemplary, in step 230, the content file, which includes the updated context file in the advertisement on demand content is uploaded to the content server 130. In addition, in step 240, the service provider can also upload the updated context file, if applicable, to the advertisement on demand service 140. In accordance with an exemplary embodiment, the content server 130 and the advertisement on demand service server 140 can be the same content cloud server 130, 140, rather than two different content cloud servers 130, 140. In step 250, the media content is played by a user 180, for example, via the media consumption device 150 and viewed, for example, on the remote media player 160. In step 260, while watching the media content, the user 180 can request information about items in the scene, for example, products or services, via input on a remote controller 170. In addition, once a product or service is requested via the input on the remote controller 170, the media consumption device 150 can decode the context information in the embedded advertisement on demand content. In step 280, with the decoded context information from the embedded advertisement on demand content, the user 180 can request information on products or services within the media content that are of interests to the user 180, which is then provided to the user 180 and the media consumption device 150 from the advertisement on demand service server 140.

Figure 3:
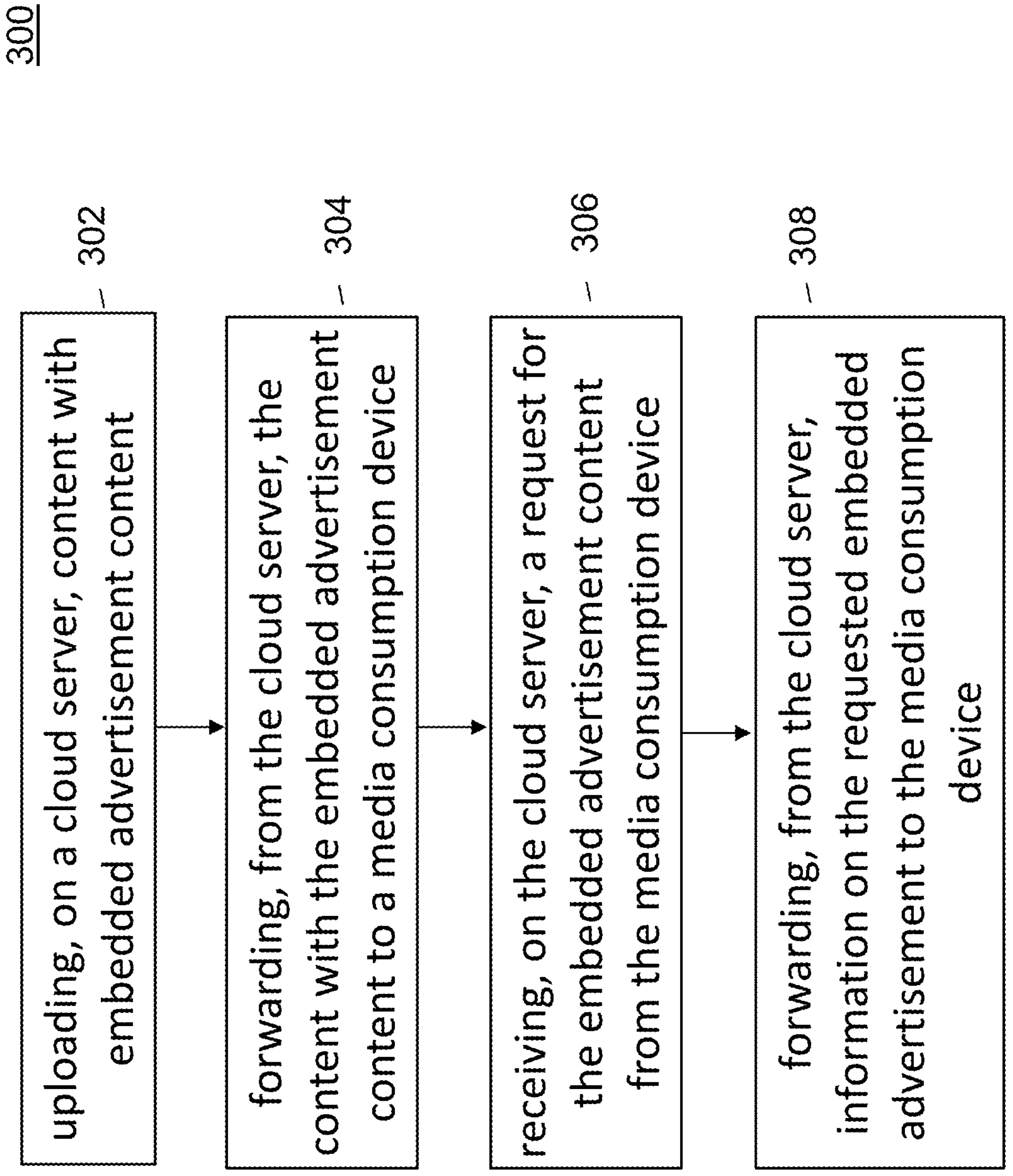
FIG. 3 is a flowchart illustrating a method for advertisement on demand in accordance with an exemplary embodiment.

FIG. 3 is a flowchart illustrating a method 300 for advertisement on demand in accordance with an exemplary embodiment. As shown in FIG. 3, in step 302, media content with embedded advertisement on demand content is uploaded on a cloud server 130, 140. In step 304, the media content with the embedded advertisement on demand content is forwarded from the cloud server 130, 140, to a media consumption device 150. In step 306, a request for the embedded advertisement on demand content is received on the cloud server 130, 140 from the media consumption device 150. In step 308, information on the requested embedded advertisement is forwarded from the cloud server 130, 140 to the media consumption device 150.

In accordance with an exemplary embodiment, the advertisement on demand content is embedded into the media content with SCTE-35 tags. For example, when the media content is Dynamic Adaptive Streaming over HTTP (MPEG-DASH) content, the advertisement on demand content can be embedded into the media content with custom tags.

In accordance with an exemplary embodiment, the cloud server comprises a content cloud server 130 for the media content with the embedded advertisement on demand content and an advertisement on demand service server 140. The advertisement on demand service server 140 can be configured to receive the request for the embedded advertisement on demand content from the media consumption device 150, and forward the information on the requested embedded advertisement to the media consumption device 150.

In accordance with an exemplary embodiment, the media consumption device 150 can be a set-top box. In addition, a request to purchase a product or a service can be received on the cloud server 130, 140, in the embedded advertisement from the set-top box. The embedded advertisement on demand content can also include a uniform resource locator for a product or service embedded in the media content. In accordance with an exemplary embodiment, when the media consumption device 150 is a set-top box, since the method is performed with a device that has been authenticated and physically located at a particular location, the set-top box can provide added security for the service provider which can help make the purchase relatively easy since the user may be able to bypass some of the authentication mechanisms that are needed to make a purchase of a product or service.

In accordance with an exemplary embodiment, a playing of the media content with the embedded advertisement on demand content to the media consumption device 150 can be paused on the cloud server 130, 140 upon the receipt of the request for the embedded advertisement on demand content from the media consumption device 150. In addition, the request for the embedded advertisement on demand content from the media consumption device 150 can be received on the cloud server 130, 140 upon a user initiating the request via input into a remote controller 170 in communication with the media consumption device 150.

Computer System Architecture

Figure 4:
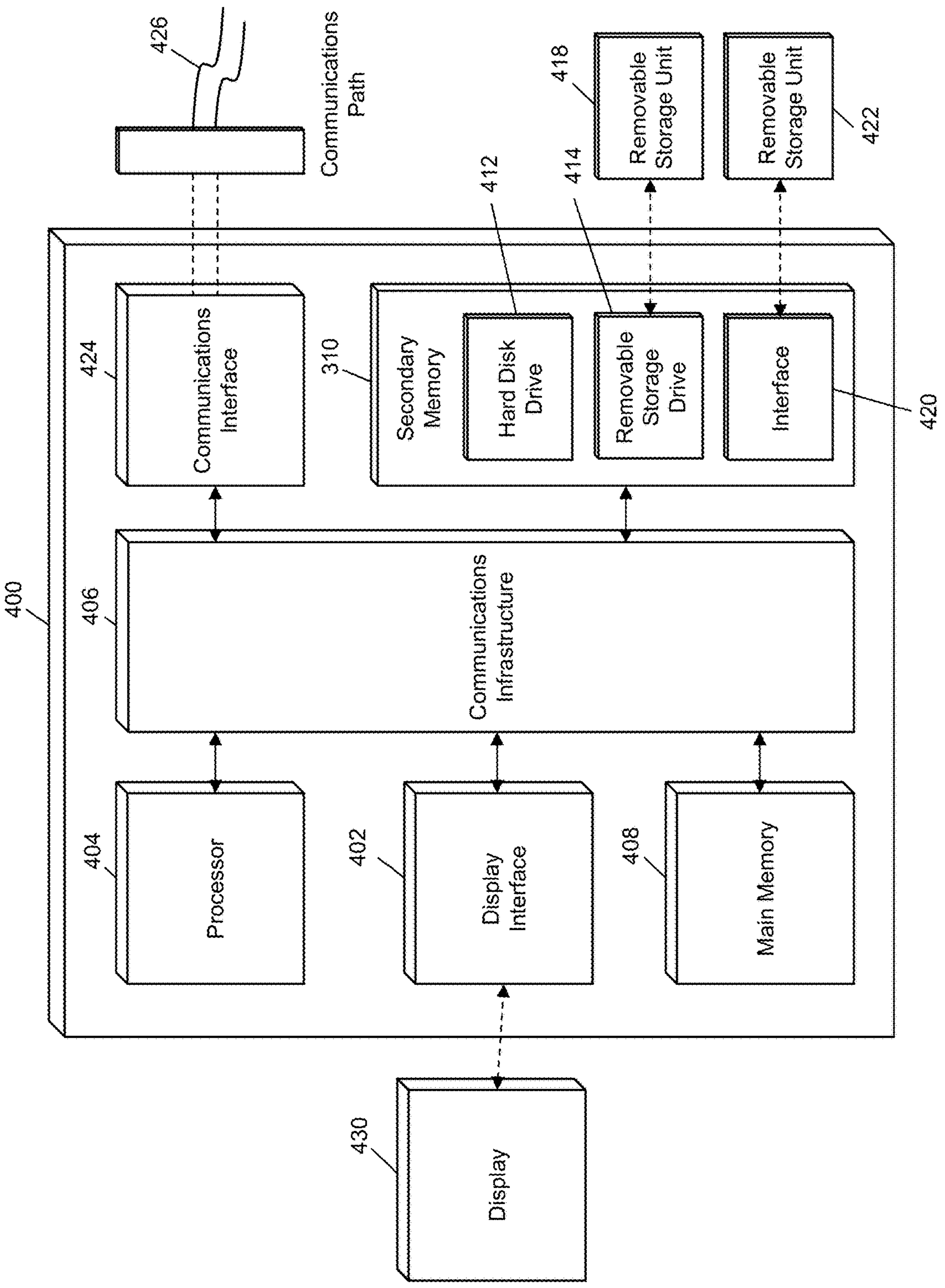
FIG. 4 is an exemplary hardware architecture for an embodiment of a communication device.

FIG. 4 illustrates a representative computer system 400 in which embodiments of the present disclosure, or portions thereof, may be implemented as computer-readable code executed on hardware. For example, the upload content server 120, the content server 130, the advertisement on demand service server 140, the media consumption device 150, and the remote media play device 160 of FIGS. 1-3 may be implemented in whole or in part by a computer system 400 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this representative computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 404 may be processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 324 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 408 and secondary memory 410, which may be memory semiconductors (e.g., DRAMs, etc.). These computer program products may be means for providing software to the computer system 400. Computer programs (e.g., computer control logic) may be stored in the main memory 408 and/or the secondary memory 410. Computer programs may also be received via the communications interface 424. Such computer programs, when executed, may enable computer system 400 to implement the present methods as discussed herein. In particular, the computer programs, when executed, may enable processor device 404 to implement the methods illustrated by FIGS. 1-3, as discussed herein. Accordingly, such computer programs may represent controllers of the computer system 400. Where the present disclosure is implemented using software executed on hardware, the software may be stored in a computer program product and loaded into the computer system 400 using the removable storage drive 414, interface 420, and hard disk drive 412, or communications interface 424.

The processor device 404 may comprise one or more modules or engines configured to perform the functions of the computer system 400. Each of the modules or engines may be implemented using hardware and, in some instances, may also utilize software executed on hardware, such as corresponding to program code and/or programs stored in the main memory 408 or secondary memory 410. In such instances, program code may be compiled by the processor device 404 (e.g., by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 400 to perform the functions disclosed herein. It will be apparent to persons having skill in the relevant art that such processes result in the computer system 300 being a specially configured computer system 400 uniquely programmed to perform the functions discussed above.

Techniques consistent with the present disclosure provide, among other features, systems and methods for advertisement on demand. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for advertisement on demand, the method comprising:

uploading, on a cloud server, media content with embedded advertisement on demand content, wherein the advertisement on demand content is contextual information about one or more items in the media content;

forwarding, from the cloud server, the media content with the embedded advertisement on demand content to a media consumption device;

receiving, on the cloud server, a user request for an advertisement associated with at least one of the one or more items in the media content from the media consumption device; and in response to receiving the user request, forwarding, from the cloud server, the advertisement associated with the at least one of the one or more item in the media content to the media consumption device.

2. The method according to claim 1, further comprising: embedding the advertisement on demand content into the media content with SCTE-35 tags.

3. The method according to claim 1, wherein the content is Dynamic Adaptive Streaming over HTTP (MPEG-DASH) content, the method further comprising:

embedding the advertisement on demand content into the media content with custom tags.

4. The method according to claim 1, wherein the cloud server comprises a content cloud server for the media content with the embedded advertisement on demand content and an advertisement on demand service server, the advertisement on demand service server configured to:

receive, from the media consumption device, the user request for the advertisement associated with the at least one of the one or more item in the media content; and forward, to the media consumption device, the advertisement associated with the at least one of the one or more item in the media content.

5. The method according to claim 1, wherein the media consumption device is a set-top box, and wherein the one or more items are a product and/or a service, the method comprising:

receiving, on the cloud server, a user request to purchase the at least one of the one or more items associated with the advertisement from the set-top box.

6. The method according to claim 1, wherein the embedded advertisement on demand content includes a uniform resource locator for a product or service embedded in the content.

7. The method according to claim 1, further comprising:

pausing, on the cloud server, a playing of the media content with the embedded advertisement on demand content to the media consumption device upon the receipt of the user request for the advertisement associated with at least one of the one or more items in the media content from the media consumption device.

8. The method according to claim 1, further comprising:

receiving, on the cloud server, the user request for the advertisement associated with at least one of the one or more items in the media content from the media consumption device upon a user initiating the request via input into a remote controller in communication with the media consumption device.

9. A non-transitory computer readable medium storing computer readable program code executed by a processor for advertisement on demand, the process comprising:

uploading, on a cloud server, media content with embedded advertisement on demand content, wherein the advertisement on demand content is contextual information about one or more items in the media content;

forwarding, from the cloud server, the media content with the embedded advertisement on demand content to a media consumption device;

receiving, on the cloud server, a user request for an advertisement associated with at least one of the one or more items in the media content from the media consumption device; and in response to receiving the user request, forwarding, from the cloud server, the advertisement associated with the at least one of the one or more item in the media content to the media consumption device.

10. The non-transitory computer readable medium according to claim 9, further comprising:

embedding the advertisement on demand content into the media content with SCTE-35 tags.

11. The non-transitory computer readable medium according to claim 9, wherein the content is Dynamic Adaptive Streaming over HTTP (MPEG-DASH) content, the method further comprising:

embedding the advertisement on demand content into the media content with custom tags.

12. The non-transitory computer readable medium according to claim 9, wherein the cloud server comprises a content cloud server for the media content with the embedded advertisement on demand content and an advertisement on demand service server, the advertisement on demand service server configured to:

receive, from the media consumption device, the user request for the advertisement associated with the at least one of the one or more item in the media content; and forward, to the media consumption device, the advertisement associated with the at least one of the one or more item in the media content.

13. The non-transitory computer readable medium according to claim 9, wherein the media consumption device is a set-top box, and wherein the one or more items are a product and/or a service, the method comprising:

receiving, on the cloud server, a user request to purchase the at least one of the one or more items associated with the advertisement from the set-top box.

14. The non-transitory computer readable medium according to claim 9, wherein the embedded advertisement on demand content includes a uniform resource locator for a product or service embedded in the content.

15. The non-transitory computer readable medium according to claim 9, further comprising:

pausing, on the cloud server, a playing of the media content with the embedded advertisement on demand content to the media consumption device upon the receipt of the user request for the advertisement associated with at least one of the one or more items in the media content from the media consumption device.

16. The non-transitory computer readable medium according to claim 9, further comprising:

receiving, on the cloud server, the user request for the advertisement associated with at least one of the one or more items in the media content from the media consumption device upon a user initiating the user request via input into a remote controller in communication with the media consumption device.

17. A system for advertisement on demand, the system comprising:

a memory; and a processor configured to:

store media content with embedded advertisement on demand content, wherein the advertisement on demand content is contextual information about one or more items in the media content;

forward the media content with the embedded advertisement on demand content to a media consumption device;

receive a user request for an advertisement associated with at least one of the one or more items in the media content from the media consumption device; and in response to receiving the user request, forward the advertisement associated with the at least one of the one or more item in the media content to the media consumption device.

18. The system according to claim 17, where the advertisement on demand content is embedded into the media content with SCTE-35 tags, or the advertisement on demand content is embedded into the media content with custom tags when the media content is Dynamic Adaptive Streaming over HTTP (MPEG-DASH) content.

19. The system according to claim 17, wherein the processor is further configured to:

receive the user request for the advertisement associated with the at least one of the one or more item in the media content from the media consumption device; and forward the advertisement associated with the at least one of the one or more item in the media content to the media consumption device.

20. The system according to claim 17, wherein the processor is further configured to:

receive a user request to purchase the at least one of the one or more items associated with the advertisement from the media consumption device, wherein the media consumption device is a set-top box, and wherein the one or more items are a product and/or a service.

21. The method according to claim 1, further comprising:

prior to receiving the user request for the advertisement associated with at least one of the one or more items in the media content from the media consumption device, receiving, on the cloud server, a user request for a list of the one or more items in the media content from the media consumption device; and forwarding, by the cloud server, the list of the one or more items in the media content to a user mobile device via augmented reality.

22. The method according to claim 1, further comprising:

requiring, by the cloud server, the user to select at least one advertisement associated with at least one of the one or more items in the media content during a set period of time or a number of frames viewed in order to continue viewing the media content.

* * * * *